United States Patent
Carter-Lewis et al.

(10) Patent No.: US 6,717,541 B1
(45) Date of Patent: Apr. 6, 2004

(54) FAST LOW COST MULTIPLE SENSOR READOUT SYSTEM

(75) Inventors: David Carter-Lewis, Ames, IA (US); Frank Krennich, Ames, IA (US); Stephane Le Bohec, Ames, IA (US); Dirk Petry, College Park, MD (US); Gary Sleege, Marshalltown, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 10/425,495

(22) Filed: Apr. 29, 2003

Related U.S. Application Data

(60) Provisional application No. 60/376,325, filed on Apr. 29, 2002.

(51) Int. Cl.[7] .................................................. H03M 1/00
(52) U.S. Cl. ........................................ 341/155; 341/144
(58) Field of Search .................................. 341/155, 144

(56) References Cited

U.S. PATENT DOCUMENTS 5,677,691 A  * 10/1997 Hosticka ..................... 341/155

* cited by examiner

*Primary Examiner*—Brian Young

(57) ABSTRACT

A low resolution data acquisition system is presented. The data acquisition system has a plurality of readout modules serially connected to a controller. Each readout module has a FPGA in communication with analog to digital (A/D) converters, which are connected to sensors. The A/D converter has eight bit or lower resolution. The FPGA detects when a command is addressed to it and commands the A/D converters to convert analog sensor data into digital data. The digital data is sent on a high speed serial communication bus to the controller. A graphical display is used in one embodiment to indicate if a sensor reading is outside of a predetermined range.

24 Claims, 3 Drawing Sheets

FAST LOW COST MULTIPLE SENSOR READOUT SYSTEM

CROSS-REFERENCE TO RELATED PATENT APPLICATIONS

This patent application claims the benefit of U.S. Provisional Patent Application No. 60/376,325, filed Apr. 29, 2002.

STATEMENT REGARDING FEDERALLY SPONSORED RESEARCH AND DEVELOPMENT

This invention was made in part with Government support under Grant Numbers DE-FG02-91ER40635 and DE-FG-91ER40635 awarded by the Department of Energy. The Government may have certain rights in this invention.

FIELD OF THE INVENTION

This invention pertains to low resolution data acquisition systems.

BACKGROUND OF THE INVENTION

Many types of data acquisition systems are known, for example transitory recorders and digital oscilloscopes, in which it is necessary to convert one or several analog signals into one or several digital signals capable of being stored in a digital memory and processed by a digital processor. These systems comprise generally an input stage constituted of one or several digitizers and of a memory for digitized data; the processor accesses the memory most often through a bus. In low-frequency systems, this memory can for example be constituted directly by the RAM of a computer. The digitized data are stored in this memory and processed by the processor of this computer either in real time or later (e.g., after all the data have been acquired).

There data acquisition systems fit into essentially two types of data acquisition systems. These two types are a dedicated microprocessor based minicomputer system and a simple data logger. The computer systems often include disc memory for data storage, CRT terminals for display of data and printers for hard copies of data. These systems have high resolution (16 bit and higher) analog to digital (A/D) converters and use twisted/shielded cabling from the sensors to the A/D converter located on a central computer. As a result, the systems are expensive and require a relatively large capital investment. While simple data loggers are relatively inexpensive, they offer simple functions only such as logging data and comparing the data to setpoints.

SUMMARY OF THE INVENTION

In accordance with the present invention, a low resolution data acquisition system is provided that is capable of using a large number of sensors at low cost. The data acquisition system converts analog signals into digital data samples and transfers the digital data samples to a host controller. The data acquisition system has readout modules that are connected in series to each other. Each readout module includes a field programmable gate array (FPGA), analog to digital converters coupled to the FPGA, and an output register that controls digital switches.

Each FPGA receives a command from the host processor to send the digital data samples to the host controller, commands the analog to digital converters to convert the analog signals to the digital data samples, obtains the digital data samples, and sends the digital data samples to the host controller. The command includes an address. The FPGA determines if the command is addressed to it. If the command is not addressed to it, the FPGA sends the command to the readout module that is connected to the FPGA output.

A high speed communication bus is used which couples the readout modules to the host controller. The high speed communication bus includes an optical serial interface for communicating data to the host controller. This allows the readout modules to be mounted at long distances from the host controller. In one embodiment, the high speed communication bus includes a RS422 interface.

The invention solves these and other problems of data acquisition systems by providing a system which efficiently digitizes information from a multiplicity of channels and transfers it to a host processor.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention provides a fast data acquisition system that can acquire data from up to $2^{13}$ sensors (i.e., 8192 sensors) per branch with 8 bit maximum resolution connected to a single computer via a high speed bus. In one embodiment, a RS-422 card is used to communicate with the data acquisition system. For a typical computer having four available PCI slots, up to eight branches of sensors (i.e., 65,536 sensors) can be used in the data acquisition system. The resolution of each sensor is set at 8 bits to provide a high speed system with a large number of channels at minimum cost. A higher resolution leads to a decrease in system speed and a higher cost system. Such higher cost systems are not needed in applications that do not require high accuracy sensors. Such applications include monitoring factory equipment for maintenance, monitoring humidity in green houses, and test equipment. The sensors used are any type of measuring device that requires a supply voltage between –5 volts and +5 volts and that outputs an analog voltage between zero and –128 millivolts. Examples of the type of sensors that can be used include humidity sensors, temperature sensors, hall-type position sensors, light sensors, and current sensors.

The high speed bus in one embodiment supports data transfer at a rate of 460 kilobits per second. For $2^{13}$ sensors, the sensors can be read out at a maximum frequency of 4 Hz. For a fewer number of sensors, the maximum frequency is higher.

Figure 1:
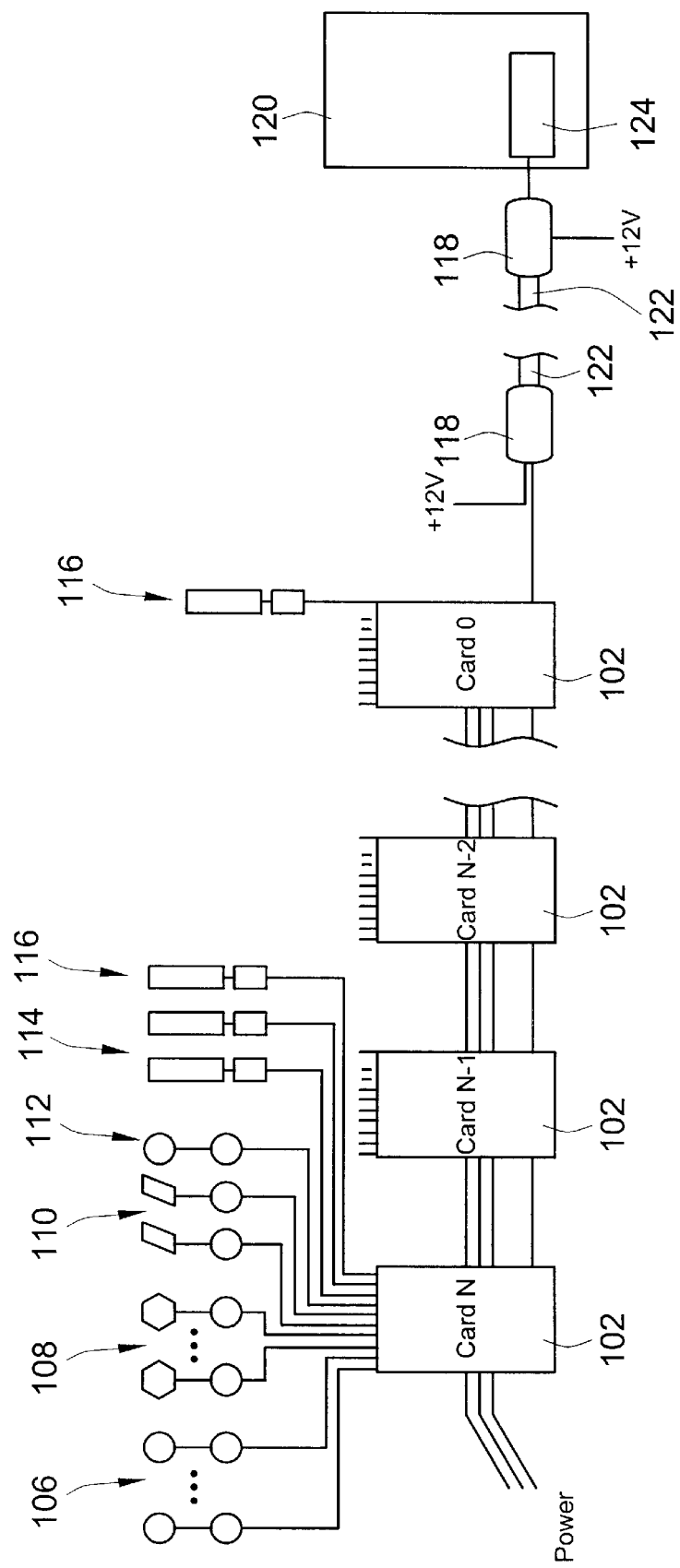
FIG. 1 is a block diagram of the data acquisition system of the present invention.

Turning now to FIG. 1, the data acquisition system 100 is shown. The data acquisition system 100 has modules 102 that read data from up to thirty two sensors. The maximum number of readout modules 102 in one embodiment is 256. As previously indicated, the sensors 104 include humidity sensors 106, temperature sensors 108, Hall Effect position sensors 110, light sensors 112, current sensors 114, and other sensors 116. Each sensor output is conditioned and sent to a readout module 102. In one embodiment, a straight 6 conductor telephone cable is used to transmit the sensor output to the readout module to significantly reduce cost. The maximum length of phone cable between a sensor 104 and the readout module 102 is thirty feet.

The readout module 102 supplies each sensor with regulated power and digitizes the analog output of each sensor with 8 bit accuracy. The readout modules 102 are daisy-chained to minimize the amount of cabling needed and to save weight. Shielded twoconductor stranded cabling is used to minimize noise pickup and electromagnetic interference (EMI). Alternatively, telephone cables may be used such as those used in households. Connections to the readout module are made with RJ-11 connectors. Other connector could be used, such as RJ-45 connectors. The readout module 102 that is at the end of the daisy-chain is connected to the data acquisition computer 120 via optical link 122 (and optoverters 118) and an RS-422 PCI card 124 in the computer 120. It should be noted that other types of cards may be used depending on the application in which the system will be used. For example, a RS-232 card can be used in applications where a low number of sensors are used. An amplification unit (not shown) is needed if the optical link 122 is longer than one thousand feet. As a result, the data acquisition system 100 can acquire data from wide-spread areas such as a factory, green house, etc. with a single data acquisition computer.

Figure 2:
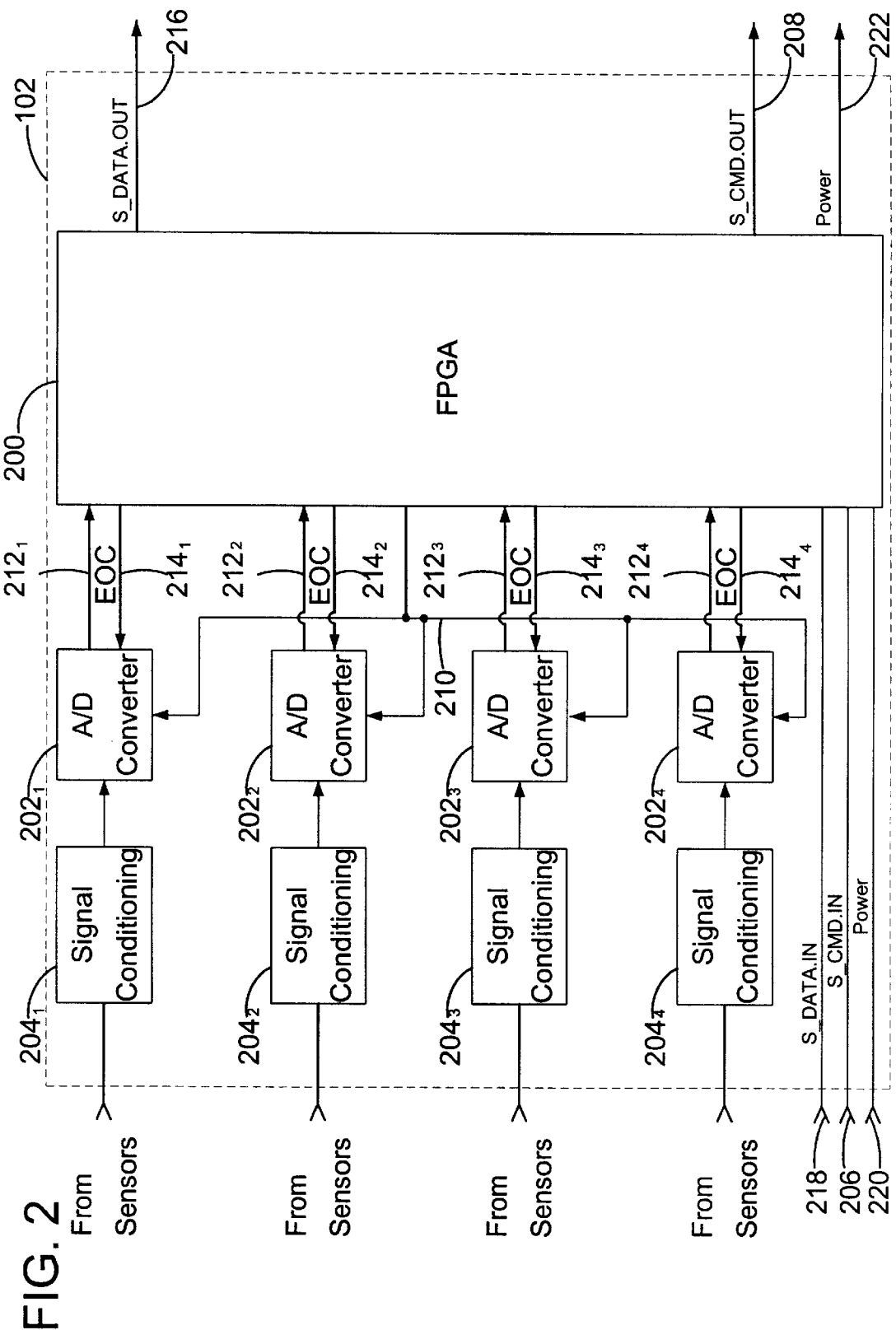
FIG. 2 is a block diagram of the readout module of FIG. 1.

Turning now to FIG. 2, each readout module 102 has a field programmable gate array (FPGA) 200 that controls fast analog to digital converters (FADCs) $202_1$–$202_4$ located on the readout module 102. It should be noted that other types of processors may be used as known in the art. The FADCs in one embodiment are AD7829 analog to digital converters from Analog Devices. Signals from the sensors 104 may be conditioned by signal conditioning circuitry $204_1$–$204_4$. The FADCs $202_1$–$202_4$ are used to convert the analog input of each sensor into an 8-bit digital output. In the embodiment shown in FIG. 2, the readout module 102 has four FADCs. Each FADC has eight channels (i.e., inputs) to which sensors may be connected. The readout module 102 may have fewer or more FADCs. The digital outputs are sent to the computer 120 for display and post processing. The readout module 102 also has output registers for controlling devices. Power is provided externally and regulated with passive regulators (e.g., linear regulators) on the readout module 102.

The computer 120 communicates with each FPGA 200 via the high speed bus. The computer sends requests to the readout modules 102 to send data to the computer 120. For a readout module 102 that does not have output registers, the request includes an address portion and a command portion. The address portion identifies the readout module 102 and the command portion contains a code that contains instructions for the FPGA. For example, one of the codes instructs the FPGA to send data to the computer. For a readout module 102 that has output registers, a request consists of the address of the readout module and data for setting the output register.

During operation, the computer 120 sends a command to the readout modules. The command has an address of the readout module 102 in which data is to be sent to the computer 120. The command in one embodiment is sent on a serial bus to the readout modules 102. Upon receiving a command at command input 206 (S_CMD_IN), the FPGA 200 determines if the command is addressed to it. The FPGA 200 sends the command on to modules connected to command output 208 (S_CMD_OUT). If the command is addressed to the FPGA 200, it determines which sensor readings are to be sent to computer 120. The FPGA 200 sends commands to the FADCs 202 on bus 210 to identify the sensor and to order the appropriate FADC to begin converting the analog sensor signal to a digital signal. When the FADC finishes converting the signal, it notifies the FPGA 200 by sending a signal on end of conversion line 214. The FPGA 200 adds a header to identify the sensor and transmits the data on the data output 216 (S_DATA_OUT). Data that is received on data input 218 (S_DATA_IN) is sent out on data output 216. Power is received at power input 220 and sent on to modules connected to power output 222. As previously indicated, the readout module 102 that is at the end of the daisy-chain is connected to the data acquisition computer 120 via the optical link 122 (and optoverters 118) and the RS-422 PCI card 124 in the computer 120.

An exemplary embodiment of one use of the data acquisition system is to monitor an array of photomultiplier (PMT) tubes placed at the focus of a dish in a groundbased gamma-ray observatory. Sixteen readout modules 102 cards are mounted around the periphery of the PMT tubes and are daisy-chained together. The photomultiplier tubes detect light pulses (i.e., Cherenkov light) from gamma rays in the atmosphere. The data acquisition system is used to monitor DC current flowing at the anodes of the PMTs. If the DC current flowing through a PMT tube anode exceeds a threshold over a long period of time, the PMT suffers premature aging and preventative maintenance can be performed on the camera. Additionally, if the dish "hits" a bright star (e.g., a bright light) as the dish scans through the sky at night, the DC current may increase to a point where a PMT tube can be damaged. The data acquisition system sends the data from the sensors to the computer. The computer adjusts the voltage to the PMT tubes to avoid damage during scanning based upon the data from the data acquisition system.

The computer sends a command on a serial line to a module 102, which passes the command on to another module that is daisy chained to the module 102. The command is passed on to the other modules with each module receiving the command on its input command line and sending it to the module daisy chained to its output command line. The command consists of two bytes. One of the bytes is a readout module address and the other byte is a value to which the FPGA 200 sets one or more output registers. Each output register provides control of up to eight digital switches that can be used to control devices connected to the switches.

When a readout module 102 receives a command that matches the module's address, the FPGA 200 of the readout module commands the FADCs to convert the sensor signals for each of its inputs (from the PMT tubes) and send it to the FPGA 200. The resulting digital data is sent to the computer on the bus via the data output line 216. The data is sent with a header that is added to the data. For a readout module having four FADCs, the data generally consists of thirty two bytes of data. A two byte checksum is added, resulting in 36 bytes of data being sent to the computer.

The computer receives the digital data samples and determines if there are any PMT tubes that are bad. In one embodiment, the bad PMT tubes are represented graphically.

Figure 3:
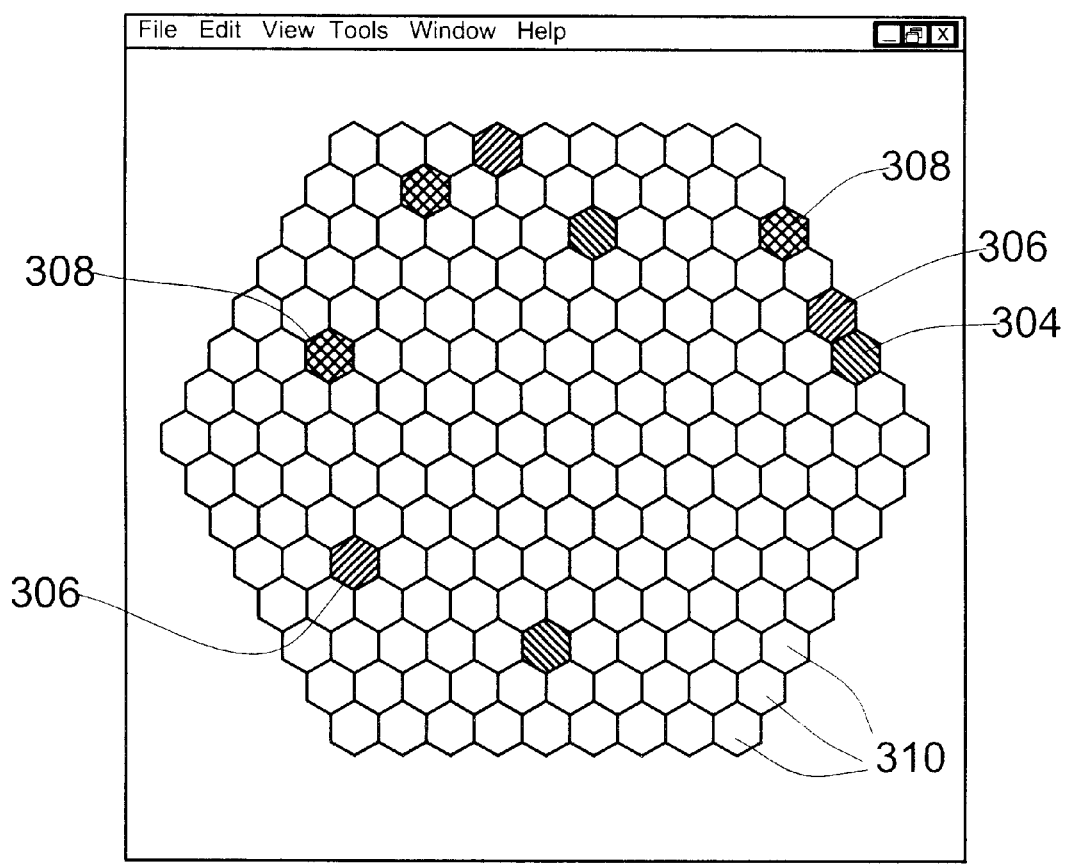
FIG. 3 is an illustration of an embodiment of the invention where a graphical display is used to indicate which sensor readings are above a threshold level.

This is shown in FIG. 3. Each PMT tube is represented by a pixel 302. A PMT that is not within the designated sensor range is color coded to indicate the PMT tube needs to be checked or replaced. For example, color 304 is used to indicate a PMT tube is in an unknown state, color 306 is used to indicate a PMT tube is in a switched off state, color 308 is used to indicate a PMT tube is bad and needs replacing, and color 310 is used to indicate that a PMT tube is in within the designated sensor range.

It can be seen that an effective, low cost, low resolution data acquisition system has been described. The data acquisition system may be used in scenarios where readout modules are in different locations from other readout modules. For example, the readout modules may be used in a factory setting to monitor processes, in a nursery to monitor temperatures in greenhouses, in a test facility located in a remote site, etc. where high resolution is not required.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A data acquisition system for converting analog signals into digital data samples and for transferring the digital data samples to a host controller, the data acquisition system comprising:
   a plurality of readout modules connected in series to each other, each readout module including:
     a field programmable gate array (FPGA);
     a plurality of eight bit analog to digital conversion means coupled to the FPGA to convert analog signals from sensors to the digital data samples;
   a high speed communication bus which couples the plurality of readout modules to the host controller, the high speed communication bus including an optical serial interface for communicating data to the host controller, the optical serial interface in communication with the plurality of readout modules; and
   wherein each FPGA is adapted to receive a command from the host processor to send the digital data samples to the host controller, command the plurality of analog to digital conversion means to convert the analog signals to the digital data samples, obtain the digital data samples, and send the digital data samples to the host controller.

2. The data acquisition system of claim 1 wherein the command includes an address and each FPGA is further adapted to determine if the command is addressed to the FPGA and send the command to an other of the plurality of readout modules connected to the FPGA.

3. The data acquisition system of claim 1 further comprising at least one passive regulator to regulate power to the plurality of readout modules.

4. The data acquisition system of claim 1 wherein each FPGA is further adapted to receive digital data samples from an other FPGA and output the digital data samples to one of an other of the plurality of readout modules and the host controller.

5. The data acquisition system of claim 1 wherein the high speed communication bus further includes a RS422 interface.

6. The data acquisition system of claim 1 wherein each of the plurality of readout modules further comprises at least one output register in communication with the FPGA.

7. The data acquisition system of claim 6 wherein the at least one output register controls a plurality of switches.

8. The data acquisition system of claim 1 wherein the plurality of readout modules are connected in series to each other with shielded two-conductor stranded cabling.

9. The data acquisition system of claim 1 wherein each of the plurality of readout modules further comprises an RJ-11 connector.

10. The data acquisition system of claim 1 further comprising a graphical display to indicate if a sensor reading is out of a predetermined range.

11. A data acquisition system for converting analog signals into digital data samples and for transferring the digital data samples to a host controller, the data acquisition system comprising:
   a plurality of readout modules, each readout module including:
     a field programmable gate array (FPGA);
     a plurality of analog to digital conversion means coupled to the FPGA to convert analog signals from sensors to the digital data samples;
     at least one output register in communication with the FPGA, the at least one output register controlling a plurality of switches;
   a high speed communication bus which couples the plurality of readout modules to the host controller, the high speed communication bus including an optical serial interface for communicating data to the host controller, the optical serial interface in communication with the plurality of readout modules; and
   wherein each FPGA is adapted to receive a command from the host processor to send the digital data samples to the host controller, command the plurality of analog to digital conversion means to convert the analog signals to the digital data samples, obtain the digital data samples, and send the digital data samples to the host controller.

12. The data acquisition system of claim 11 wherein the command includes an address and each FPGA is further adapted to determine if the command is addressed to the FPGA and send the command to an other of the plurality of readout modules connected to the FPGA.

13. The data acquisition system of claim 11 further comprising at least one passive regulator to regulate power provided to the readout module.

14. The data acquisition system of claim 11 wherein each FPGA is further adapted to receive digital data samples from an other FPGA and output the digital data samples to one of another of the plurality of readout modules and the host controller.

15. The data acquisition system of claim 11 wherein the high speed communication bus further includes a RS422 interface.

16. The data acquisition system of claim 11 wherein the plurality of readout modules are connected in series to each other with shielded two-conductor stranded cabling.

17. The data acquisition system of claim 11 wherein the plurality of readout modules are connected in series to each other with telephone cable.

18. The data acquisition system of claim 11 wherein each of the plurality of readout modules further comprises an RJ-11 connector.

19. The data acquisition system of claim 11 further comprising a graphical display to indicate if a sensor reading is out of a predetermined range.

20. The data acquisition system of claim 11 wherein the plurality of analog to digital conversion means comprises a plurality of 8 bit analog to digital converters.

21. The data acquisition system of claim 20 wherein the plurality of eight bit analog to digital converters comprises four eight bit analog to digital converters.

22. The data acquisition system of claim 21 wherein each eight bit analog to digital converter has at least eight multiplexed analog inputs.

23. The data acquisition system of claim 11 wherein the analog sensors are outputted from a photo multiplier tube.

24. The data acquisition system of claim 11 wherein at least one of the plurality of readout modules is locatable at a remote site.

* * * * *